UNITED STATES PATENT OFFICE.

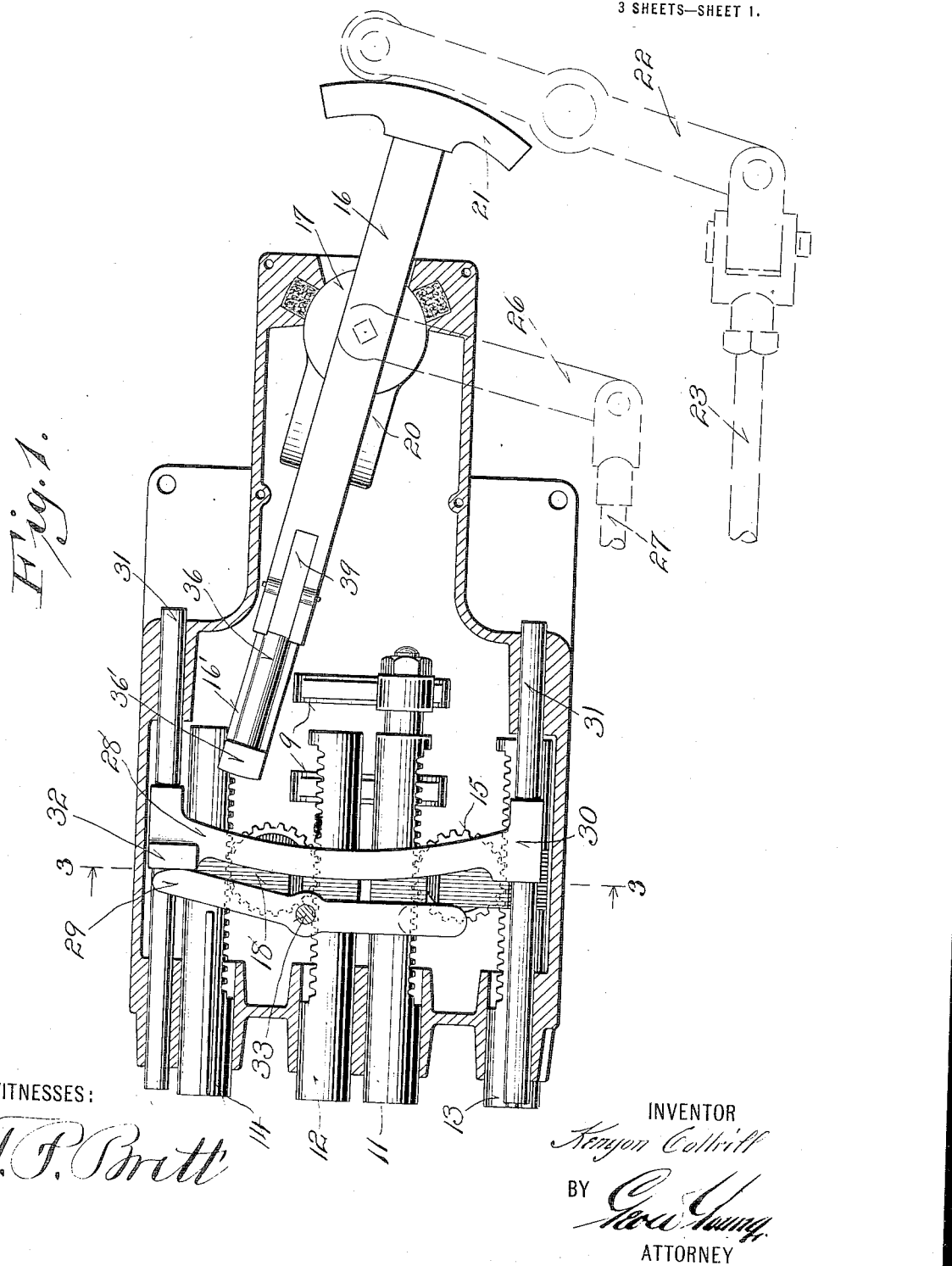

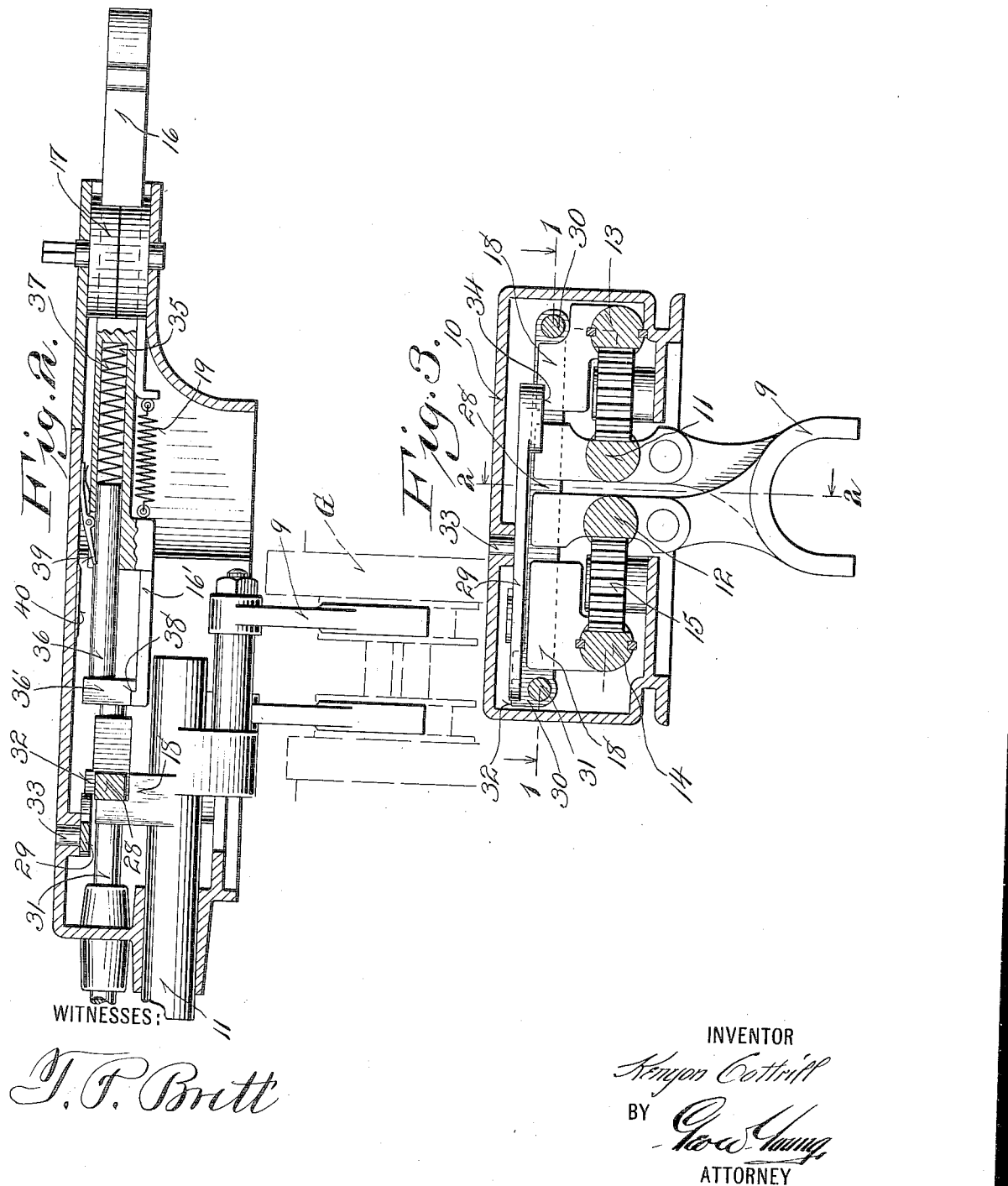

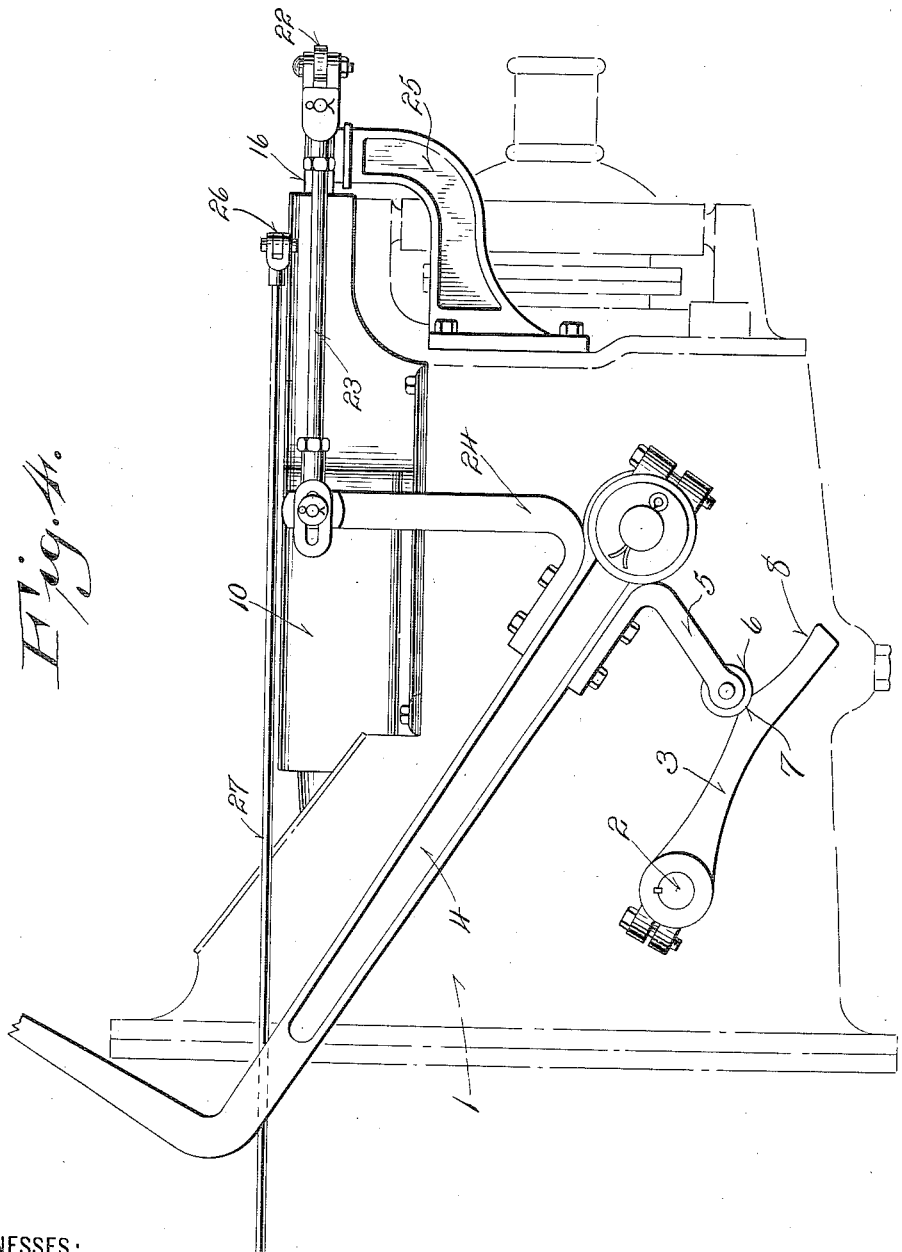

KENYON COTTRILL, OF FRESNO, CALIFORNIA, ASSIGNOR OF THREE-FOURTHS TO C. S. PIERCE, CARL A. LISENBY, AND R. J. WOODWARD, JOINTLY, ALL OF FRESNO, CALIFORNIA.

GEAR-SHIFTING MECHANISM.

1,319,514.            Specification of Letters Patent.      Patented Oct. 21, 1919.

Application filed July 12, 1918. Serial No. 244,655.

*To all whom it may concern:*

Be it known that I, KENYON COTTRILL, a citizen of the United States, and resident of Fresno, in the county of Fresno and State of California, have invented certain new and useful Improvements in Gear-Shifting Mechanism; and I do hereby declare that the following is a full, clear and exact description thereof.

My invention relates to gear shifting mechanisms such as that disclosed in my copending application Serial No. 201,103, filed November 9, 1917.

The present mechanism is primarily adapted for use in connection with that form of motor-driven vehicle provided with a so-called unit power plant, or in which the selective gear transmission mechanism is located adjacent the clutch connecting the engine shaft with the main drive shaft.

An additional object of the invention is to provide a supplemental retracting means for returning the gear shifting elements to neutral position prior to actuating the same.

A still further object is to provide in connection with the improved gear shifting mechanism, means for more readily controlling the operation of the clutch than is possible in machines of the usual construction.

With these and other objects and advantages in view, the invention resides in the novel features of construction, combination and arrangement of parts which will be hereinafter more particularly described and claimed.

In the accompanying drawings Figure 1 represents a substantially horizontal sectional view taken on the plane of the line 1—1 of Fig. 3.

Fig. 2 is a longitudinal vertical section on the plane of the line 2—2 of Fig. 3.

Fig. 3 is a vertical transveres sectional view on the plane of the line 3—3 of Fig. 1, and Fig. 4 is a side elevational view of a unit power plant having my invention applied thereto, the same also being shown in side elevation.

Referring more particularly to the drawings wherein similar reference characters indicate like parts in all of the views, it will be seen that the numeral 1 designates a unit power plant in which is inclosed a conventional type of clutch and the usual selective gear transmission. The movable portion of this clutch (not shown) is shifted toward and away from the relatively stationary portion by the rotation of a shaft 2 which projects beyond the wall of the housing of the power plant, the same having a crank arm 3 keyed thereto. Pivoted to the same side of said housing from which the end of the shaft 2 projects is a clutch pedal 4 of ordinary type, the same being fulcrumed at a point adjacent the free end of the crank arm 3.

A crank arm engaging finger 5 having an anti-friction roller 6 on its free end projects downwardly and forwardly from the pedal adjacent its fulcrum point and engages the crank arm 3. Said crank arm has its upper face provided with an intermediate raised portion 7 having a depression in which the roller 6 rests; and the portion of the crank arm between said raised portion and its free end is provided with an arcuate upper face as at 8, the arc of the same being struck on a curve, the center of which is the fulcrum point of the pedal 4.

By such arrangement as this, the nature of which is clearly depicted in Fig. 4, the clutch may be easily released by the downward movement of the clutch pedal 4, said clutch being fully disconnected when the roller 6 is engaged with the portion 7 of the crank arm 3. Further downward movement of the pedal causes the finger 5 to rock downwardly and rearwardly, but owing to the shape of the free end portion of the crank arm 3, the latter is not moved to any appreciable degree. Thus when the clutch is fully released there is no further movement of the same even though additional continuous pressure is applied to the clutch pedal; this obviates the necessity of compressing the springs which hold the clutch closed as is customary with similar clutch disengaging mechanisms. The advantage of this construction is utilized to increase the efficiency of the gear shifting mechanism in a manner which will be hereinafter more particularly explained.

The gears indicated generically in Fig. 2 by the reference letter G are located within the housing of the power plant 1 and are selectively shifted into engagement with each other by the operation of gear shifting forks 9 that extend below the bottom of a casing 10, the latter being secured to the power plant 1 as most clearly indicated in Fig. 4. In the present instance two of these forks 9 are provided, one being carried by a gear shifting rod 11 and the other by a similar rod 12, both of which are longitudinally slidable in bearings carried within the casing 10. Each of these rods 11 and 12 has a similar gear shifting rod disposed parallel therewith, the coöperating rod of the gear shifting rod 11 being designated by the numeral 13 while the other rod for co-action with the gear shifting rod 12 is numbered 14.

By shifting the rods 11 and 12 in opposite directions different combinations of gearing will result whereby to drive the vehicle on which the mechanism is mounted at various speeds. Movement of the rods 11 and 12 in one direction is procured through the instrumentality of the respective coöperating rods 13 and 14 with which they are connected by the pinions 15, the teeth of which mesh with rack teeth on the adjacent faces of the rods 11 and 13, and 12 and 14.

The shifting of the rods 11 and 12 with the consequent movement of the gears G is procured by the longitudinal movement of a selector bar 16, the same being slidably mounted in a rotatable block 17 pivoted within the casing 10. One end of the selector bar is spaced from shoulders 18, one of which is formed on each rod 11, 12, 13 and 14 and is adapted to be engaged with any one of the same, when alined therewith, by longitudinal movement thereof, said bar having a head 16' for this purpose. A contractile spring 19, having one end fixed to a portion 20 of the block 17 and the other end connected with the bar 16, normally urges the latter away from said shoulders 18 and outwardly of the casing 10.

The outer end of the selector bar 16 has an arcuate head 21 with which one end of a lever 22 continuously engages, the other end of the lever being pivoted to a connecting rod 23, which in turn is similarly joined with an arm 24 that extends upwardly from the clutch pedal 4 adjacent its fulcrum point. This arrangement is fully disclosed in Figs. 1 and 4, in the latter of which it will also be seen that the lever 22 is carried by a bracket 25 mounted on the housing of the power plant 1. The pedal 4, thus in addition to actuating the clutch, operates the inward movement of the selector bar 16 and the consequent shifting of certain of the gear shifting rods.

The selector bar is alined with any one of the shoulders 18 of the several gear shifting rods by moving the block 17 on its pivot. For conveniently carrying out this selective movement of the bar, a crank 26 is extended from the pivotal point of said block 17 and has an actuating rod 27 pivoted thereto. Any suitable means for operating the rod 27 may be provided, as for instance the means illustrated in Figs. 1 and 5 of the drawings in the application hereinbefore referred to.

Since it is necessary to have the gears G in neutral position before certain of them may be meshed, means is provided for returning the gear shifting rods 11, 12, 13 and 14 to a normal, or so-called neutral, position after certain of the same have been shifted and before they or certain other of the same are moved in different directions. This includes a main retractor carriage 28 and a supplementary retractor bar 29. The retractor carriage 28 is extended across the gear shifting rods and is adapted to engage the several shoulders 18 thereof, its opposite ends being provided with enlargements 30 having sliding engagement with relatively stationary rods 31 carried by the casing 10.

One end of the carriage has a boss 32 formed thereon with which one end of the retractor bar 29 engages, said bar being pivoted intermediate its ends as at 33 to the top of the casing 10 and is disposed in a plane above the tops of the shoulders 18 (see Figs. 2 and 3). The end of the bar 29 opposite that which engages the boss 32 has a depending portion 34 of sufficient length to engage the shoulders 18 of the gear shifting rods 11 and 13.

The inner end portion of the selector bar 16 adjacent the part 16' thereof is provided with a socket 35 in which the end of a headed rod 36 slidably extends, said rod being normally forced outwardly by the expansion of a helical spring 37, outward movement however, being limited by the contact of the head 36' thereof with a shoulder 38 on the part 16' of the selector bar. Also under certain conditions inward movement of the rod 36 is absolutely prevented by the engagement of one end of a pivoted pawl 39 in a notch cut in the former.

The operation of the last mentioned parts of the invention is substantially as follows: The selector bar 16 is alined with the shoulder 18 of any one of the gear shifting rods, for instance the rod which controls the low speed transmission, after the clutch pedal has been pressed downwardly to successively disengage the clutch and move said bar outwardly, whereupon on the release of said pedal the bar 16 will be moved inwardly prior to the reëngagement of the clutch. During such inward movement of the selector bar, the head 36' of the rod 36 will be first brought into engagement with the retractor carriage 28 which causes the several shoulders 18 to be transversely alined and all of the gear shifting rods returned to normal inoperative position. The return of the gear shifting rods 11 and 13 to accurate neutral position is aided by the retractor bar 29 which, it will be seen from Fig. 1, is rocked about its pivot when the retractor carriage is shifted theretoward, it being appreciated that this retractor bar may if desired be eliminated since the carriage 28 in its final position engages all of the shoulders of the selector bars.

However, after the retractor carriage has been moved a pre-determined distance by the similar movement of the selector bar 16, the pawl 39 will contact with a depending portion 40 on the cover of the casing 10 to release the same from the notch in said rod, the latter being thereby capable of inward movement against the tension of the spring 37. The retractor carriage is thus not moved beyond a predetermined distance. The gears G will thus be returned to neutral position, so that when the part 16' of the selector bar strikes one of the shoulders 18, a certain of said gears will be shifted and meshed with a certain other gear G.

I claim:

1. A mechanism of the class described comprising a pair of gear shifting elements, a shifting element engaging member, means for moving the member to selectively engage either of said elements, a retractor engageable with said elements to return the same to normal position after being actuated, a member movably carried by the element engaging member and yieldably urged away from said element engaging member toward the retractor for engagement with said retractor to actuate the same in the initial portion of engaging movement of said element engaging member.

2. A device of the class described comprising a pair of gear shifting elements, a tubular shifting element engaging member, means for moving the member to selectively engage either of said elements, a retractor engageable with said elements to return the same to normal position after being actuated, and a sliding operating bar in said tubular member and normally extended outwardly thereof.

3. A device of the class described comprising a pair of gear shifting elements, a tubular shifting element engaging member, means for moving the member to selectively engage either of said elements, a retractor engageable with said elements to return the same to normal position after being actuated, a sliding operating bar in said tubular member and normally extended outwardly thereof, means for holding the rod in extended position, and means for releasing the holding means when said member has been moved a predetermined distance.

4. The combination with an engine power plant, means to be driven, a selective speed transmission mechanism including a clutch, of a clutch operating shaft, a crank arm on one end of said shaft, one side of said crank arm having an intermediate raised portion, a clutch pedal pivoted adjacent the free end of said clutch arm, a crank arm engaging finger extended from the pedal adjacent its pivot, and a connection between said pedal and the selective speed transmission mechanism.

5. The combination with an engine power plant, means to be driven, and a selective speed transmission mechanism including a clutch, of a clutch operating shaft, a crank arm on one end of said shaft, a clutch pedal pivoted adjacent the free end of the clutch crank arm, a finger extending from the pedal adjacent its pivot for engagement with the crank arm, the outer end portion of the crank arm being curved, said curvature being concentric with the pivot of the clutch pedal when the crank arm is in a position corresponding to released position of the clutch, and a connection between said clutch pedal and the selective speed transmission mechanism.

In testimony that I claim the foregoing I have hereunto set my hand at Fresno, in the county of Fresno and State of California.

KENYON COTTRILL.